United States Patent
Yoshimura et al.

(10) Patent No.: US 7,610,270 B2
(45) Date of Patent: Oct. 27, 2009

(54) SERVICE RETRIEVAL APPARATUS HAVING AUTOMATIC CHANGE FUNCTION FOR RETRIEVAL CONDITIONS AND METHOD THEREFOR

(75) Inventors: Koichi Yoshimura, Ashigarakami-gun (JP); Junichi Okuyama, Ashigarakami-gun (JP)

(73) Assignee: Fuji Xerox Co. Ltd., Tokyo (JP)

( * ) Notice: Subject to any disclaimer, the term of this patent is extended or adjusted under 35 U.S.C. 154(b) by 469 days.

(21) Appl. No.: 10/627,915

(22) Filed: Jul. 28, 2003

(65) Prior Publication Data

US 2005/0076009 A1 Apr. 7, 2005

(30) Foreign Application Priority Data

Dec. 19, 2002 (JP) ............................. 2002-368913

(51) Int. Cl.
*G06F 7/00* (2006.01)
*G06F 17/30* (2006.01)

(52) U.S. Cl. ........................ 707/3; 707/104.1; 701/209; 358/1.15

(58) Field of Classification Search ....................... 707/3
See application file for complete search history.

(56) References Cited

U.S. PATENT DOCUMENTS

| | | | | |
|---|---|---|---|---|
| 5,761,496 A | * | 6/1998 | Hattori | 707/5 |
| 5,995,721 A | * | 11/1999 | Rourke et al. | 358/1.15 |
| 6,026,388 A | * | 2/2000 | Liddy et al. | 707/1 |
| 6,487,594 B1 | * | 11/2002 | Bahlmann | 709/225 |
| 6,498,612 B1 | * | 12/2002 | Brown et al. | 715/762 |
| 6,928,424 B2 | * | 8/2005 | Honda | 707/1 |
| 6,950,847 B2 | * | 9/2005 | Harrisville-Wolff et al. | 709/201 |
| 7,085,763 B2 | * | 8/2006 | Ochiai et al. | 707/10 |
| 7,177,869 B2 | * | 2/2007 | Yoshimura et al. | 707/10 |
| 2002/0001099 A1 | * | 1/2002 | Okuda et al. | 358/1.15 |
| 2002/0051178 A1 | * | 5/2002 | Nakayasu et al. | 358/1.15 |
| 2002/0075509 A1 | * | 6/2002 | Wiechers | 358/1.15 |
| 2002/0078025 A1 | | 6/2002 | Tanaka | |
| 2003/0055817 A1 | * | 3/2003 | Yoshimura et al. | 707/3 |
| 2003/0204497 A1 | * | 10/2003 | Kalogeraki et al. | 707/3 |
| 2004/0083210 A1 | | 4/2004 | Ochiai et al. | |
| 2004/0122812 A1 | * | 6/2004 | Yoshimura et al. | 707/3 |

FOREIGN PATENT DOCUMENTS

CN 1279440 A 1/2001

(Continued)

*Primary Examiner*—John R. Cottingham
*Assistant Examiner*—Michael Pham
(74) *Attorney, Agent, or Firm*—Oliff & Berridge, PLC

(57) ABSTRACT

A service retrieval apparatus has a service information database which stores service information including a type of service provided by a server and positional information, and a service retrieval apparatus database which stores information including installation positions of other service retrieval apparatuses. A service retrieval unit generates retrieval conditions to execute service retrieval in response to a service retrieval request from a client. When it is judged by a retrieval result judgment unit that a result of the retrieval by the service retrieval unit does not satisfy judgment criteria set in advance, a retrieval range setting unit changes a retrieval range included in the retrieval conditions so as to be wider or narrower. The service retrieval unit performs service retrieval again with respect to the change retrieval range and obtains a retrieval result with which a user is satisfied.

9 Claims, 9 Drawing Sheets

FOREIGN PATENT DOCUMENTS

| | | |
|---|---|---|
| JP | A-6-223117 | 8/1994 |
| JP | A 2000-312222 | 11/2000 |
| JP | A-2001-109766 | 4/2001 |
| JP | A 2001-284485 | 10/2001 |
| JP | A-2002-140364 | 5/2002 |

* cited by examiner

SERVICE RETRIEVAL APPARATUS HAVING AUTOMATIC CHANGE FUNCTION FOR RETRIEVAL CONDITIONS AND METHOD THEREFOR

BACKGROUND OF THE INVENTION

1. Field of the Invention

The present invention relates to a service retrieval apparatus which provides information indicating which server provides what kind of service in a network to a client which is intended to receive the service, and a method therefor.

2. Description of the Related Art

A wide area computer network represented by the Internet is not a uniform single network. It is constituted as an aggregate in which a large number of networks with different operators are mutually connected and logically hierarchized. Types of networks constituting the wide area computer network include an IP (internet Protocol) sub-network, a domain, a company intranet, an ISP (Internet Service Provider), and the like. Each network is operated according to network system designs and operation policies that are different from each other. The mutual connection of the networks is performed by a network relay apparatus such as a router or a firewall and, at the same time, mutual interference of the networks is prevented by the network relay apparatus.

A service provided for supporting an application via a network (hereinafter referred to simply as "service") is generally provided by a server connected to the network. Thus, the service has both an aspect of a service in a network space and a server in a geographical space. Usually, a network where a certain service is located and a geographical place where a server providing the service is located are not in a direct dependency relation. A mutual connection relation among networks depends upon organizations operating the networks. Therefore, even if servers providing certain services are located in places geographically close to a client, networks to which the servers are connected, respectively, may be different.

Since a service is identified according to a location on a network (network address, domain name, URL (Uniform Resource Locator), etc., hereinafter referred to as "service location"), a user or a client apparatus (e.g., scanner, device control apparatus) uses respective services by designating a service location.

Even if services are of the same kind (e.g., print service), service attributes such as quality (e.g., resolution), performance (e.g., paper discharge speed), an additional function (e.g., presence or absence of a sorter), a communication protocol (e.g., various print protocols), a license (e.g., presence or absence of an access right), and cost are different depending on the service or the server. Therefore, in using a desired service, a user goes through stages of clarifying contents which the user should request such as desired specific service attributes, that is, restricting conditions (e.g., protocol to be supported, type of billing to be used), or measurement criteria to be minimized or maximized (e.g., cost, quality), comparing the contents to be requested and service attributes of each service, selecting one service which satisfies the request and then, specifying a service location where the user can be provided with the service.

Unlike a service provided by each server, a retrieval service provided by a service retrieval apparatus is a service for supporting these stages in the case in which a user does not have knowledge concerning a service location or service attributes such as the case in which a user makes connection to a network for the first time or the case in which a user makes connection to a network temporarily in a place the user has moved to or the like. In other words, by providing the retrieval service, the service retrieval apparatus informs the user of one or more servers capable of providing a service desired by the user. However, when the service retrieval apparatus specifies a server, geographical information of the server, that is, a geographical location where the server is located may be a restricting condition for the user or a client apparatus wishing to use the service. A representative example of such a service is a print service. In the print service, it is necessary to consider a locational problem in that where paper is discharged in selecting a server providing the print service in order to output a processing result to a physical medium such as paper.

Japanese Patent Application No. 2001-284485 (hereinafter referred to "commonly assigned application"), which was filed by the same applicant, describes a method of providing information on what kind of services are provided by respective servers connected to a network to a user who intends to be provided with a service. In the service retrieval method described in this application, a range to be a target of retrieval in the network is set, disclosed service information is retrieved in the set retrieval range, and information such as service locations and service attributes obtained as a result of the retrieval is provided to a user.

Incidentally, depending upon retrieval conditions designated by a user, it is possible that a service satisfying the retrieval conditions does not exist in a retrieval range set in the conditions. In this case, a notice to the effect that no service conforming to the retrieval conditions exists is returned to the user. The user having received such a retrieval result resets a retrieval range or changes the retrieval conditions to request a retrieval service again in order to find a desired service.

On the contrary, depending upon retrieval conditions designated by a user, it is possible that services satisfying the retrieval conditions exist in an extremely large number in a retrieval range set in the conditions. In this case, information on the extremely large number of service is returned to the user. The user having received such a retrieval result resets a retrieval range or changes the retrieval conditions to request a retrieval service again in order to narrow down the information. Note that a technique related to this application is described in Japanese Patent Laid-Open Publication No. 2000-312222.

As described above, the user is inconvenienced because, when contents of the processing result of the retrieval service obtained by requesting the retrieval service are not satisfactory, the user has to reconsider and reset retrieval conditions, and then send a retrieval request again.

In addition, the processing result of the retrieval service is outputted to a screen or a print medium to be confirmed by the user. However, it is inconvenient if the processing result of the retrieval service is outputted in a state in which it can not easily used, even if the contents of the processing result of the retrieval service are satisfactory.

SUMMARY OF THE INVENTION

The present invention has been devised in order to solve the above-described problems, and it is an advantage of the present invention that there is provided a service retrieval apparatus and a method therefor which realize convenience of a user of a retrieval service, and a client apparatus using the service retrieval apparatus.

In order to attain the above-described advantage, a service retrieval apparatus in accordance with the present invention is a service retrieval apparatus which provides a retrieval service for retrieving a service provided by a server connected to a network in response to a request from a client, and returning a result of the retrieval, and comprises retrieval means which sets retrieval conditions according to the request from the client and retrieves a service based upon the set retrieval conditions, and retrieval result judgment means which judges whether or not a result of the retrieval by the retrieval means satisfies judgment criteria set in advance, characterized in that, when it is judged by the retrieval result judgment means that the retrieval result does not satisfy the judgment criteria, the retrieval means changes the retrieval conditions and performs retrieval again.

In addition, the service retrieval apparatus is characterized in that, when it is judged by the retrieval result judgment means that the number of services included in the retrieval result has not reached the lower limit number of services set as the judgment criteria, the retrieval means changes the retrieval conditions so as to be wider in scope and performs retrieval again.

Further, the service retrieval apparatus is characterized in that, when it is judged by the retrieval result judgment means that the number of services included in the retrieval result has exceeded the upper limit number of services set as the judgment criteria, the retrieval means changes the retrieval conditions so as to be narrower in scope and performs retrieval again.

A service retrieval apparatus in accordance with another aspect of the present invention is a plurality of service retrieval apparatuses which provide a retrieval service for retrieving a service provided by a server connected to a network in response to a request from a client and returning a result of the retrieval, and comprises a service information database which stores service information including address information and installation position information of the server and attribute information of a service provided by the server, a service retrieval apparatus database which, when the network is divided into a plurality of sub-networks, stores address information and installation position information of a service retrieval apparatus with each sub-network included in a retrieval range, retrieval range setting means which, by retrieving the service retrieval apparatus database based upon inputted retrieval conditions, specifies one or more service retrieval apparatuses conforming to the retrieval conditions and set sub-networks, which correspond to the specified service retrieval apparatuses, as a retrieval range for the request, retrieval means which causes the retrieval range setting means to set a range for retrieval in response to a request from the client and requests its own service retrieval apparatus of another service retrieval apparatuses included in the set retrieval range to perform retrieval to thereby execute service retrieval, and retrieval result judgment means which judges whether or not a result of the retrieval by the retrieval means satisfies judgment criteria set in advance, characterized in that, when it is judged by the retrieval result judgment means that the retrieval result does not satisfy the judgment criteria, the retrieval means changes the retrieval range corresponding to the request from the client and performs retrieval again.

In addition, the service retrieval apparatuses are characterized in that, when it is judged by the retrieval result judgment means that the number of services included in the retrieval result has not reached the lower limit number of services set as the judgment criteria, the retrieval means changes the retrieval range according to the request from the client so as to be wider and performs retrieval again.

Further, the service retrieval apparatuses are characterized in that, when it is judged by the retrieval result judgment means that the number of services included in the retrieval result has exceeded the upper limit number of services set as the judgment criteria, the retrieval means changes the retrieval range corresponding to the request from the client so as to be narrower and performs retrieval again.

In addition, the service retrieval apparatuses are characterized in that the retrieval means performs retrieval with respect to a new retrieval range excluding the range for which retrieval has already been performed.

In addition, the service retrieval apparatuses are characterized in that the retrieval means performs narrowing-down of the retrieval range for which retrieval has already been performed.

Further, the service retrieval apparatuses are characterized by further comprising reply means which rearranges the result of the retrieval by the retrieval means based upon values with respect to attribute items included in the retrieval conditions, and then returns the retrieval result to the client.

A client apparatus in accordance with the present invention is a client apparatus which retrieves a service provided by a server connected to a network in response to a service retrieval request and sends the service retrieval request to a service retrieval apparatus providing a retrieval service for returning a result of the retrieval, comprises retrieval result receiving means which receives a retrieval result sent from the service retrieval apparatus in response to the service retrieval request, selection means which selects an attribute item, magnitudes of which can be compared, from attribute items included in retrieval conditions of the service and output means which rearranges a plurality of pieces of service information included in the retrieval result based upon values of the attribute items selected by the selection means included in each piece of service information to output the service information.

A service retrieval method in accordance with the present invention is a service retrieval method which retrieves a service provided by a server connected to a network in response to a request from a client and returns a result of the retrieval, and comprises a retrieval step of setting retrieval conditions in response to a request of the client and retrieves a service based upon the set retrieval conditions, a retrieval result judgment step of judging whether or not a result of the retrieval by the retrieval step satisfies judgment criteria set in advance, and a reply step of returning the result of the retrieval by the retrieval means to the client, characterized in that, when it is judged by the retrieval result judgment step that the retrieval result does not satisfy the judgment criteria, the retrieval step changes the retrieval conditions and performs retrieval again.

In addition, the service retrieval method is characterized in that, when it is judged by the retrieval result judgment step that the number of services included in the retrieval result has not reached the lower limit number of services set as the judgment criteria, the retrieval step changes the retrieval conditions so as to be wider in scope and performs retrieval again.

In addition, the service retrieval method is characterized in that the retrieval means performs retrieval with respect to a new retrieval range excluding the range for which retrieval has already been performed.

In addition, the service retrieval method is characterized in that, when it is judged by the retrieval result judgment step that the number of services included in the retrieval result has exceeded the upper limit number of services set as the judgment criteria, the retrieval step changes the retrieval conditions so as to be narrower in scope and performs retrieval again.

In addition, the service retrieval method is characterized in that the retrieval step performs narrowing-down of the retrieval range for which retrieval has already been performed.

Further, the service retrieval method is characterized by further comprising a reply step of rearranging the result of the retrieval by the retrieval step based upon values with respect to attribute items included in the retrieval conditions, and then returns the retrieval result to the client.

According to the present invention, when a retrieval result which is satisfactory for a user is not obtained with respect to a retrieval request from a client, a satisfactory retrieval result is obtained by changing retrieval conditions and performing retrieval again. Thus, labor and time required of the user to reset the retrieval range or change the retrieval conditions and perform retrieval again can be reduced.

In addition, when service information, which is a retrieval result, is outputted, the service information is rearranged based upon values of attribute items included in retrieval conditions. Thus, a burden placed on a user in selecting any one service out of a large number of items of service information visually can be reduced.

DESCRIPTION OF PREFERRED EMBODIMENT

A preferred embodiment of the present invention will be described with reference to the accompanying drawings.

Figure 1:
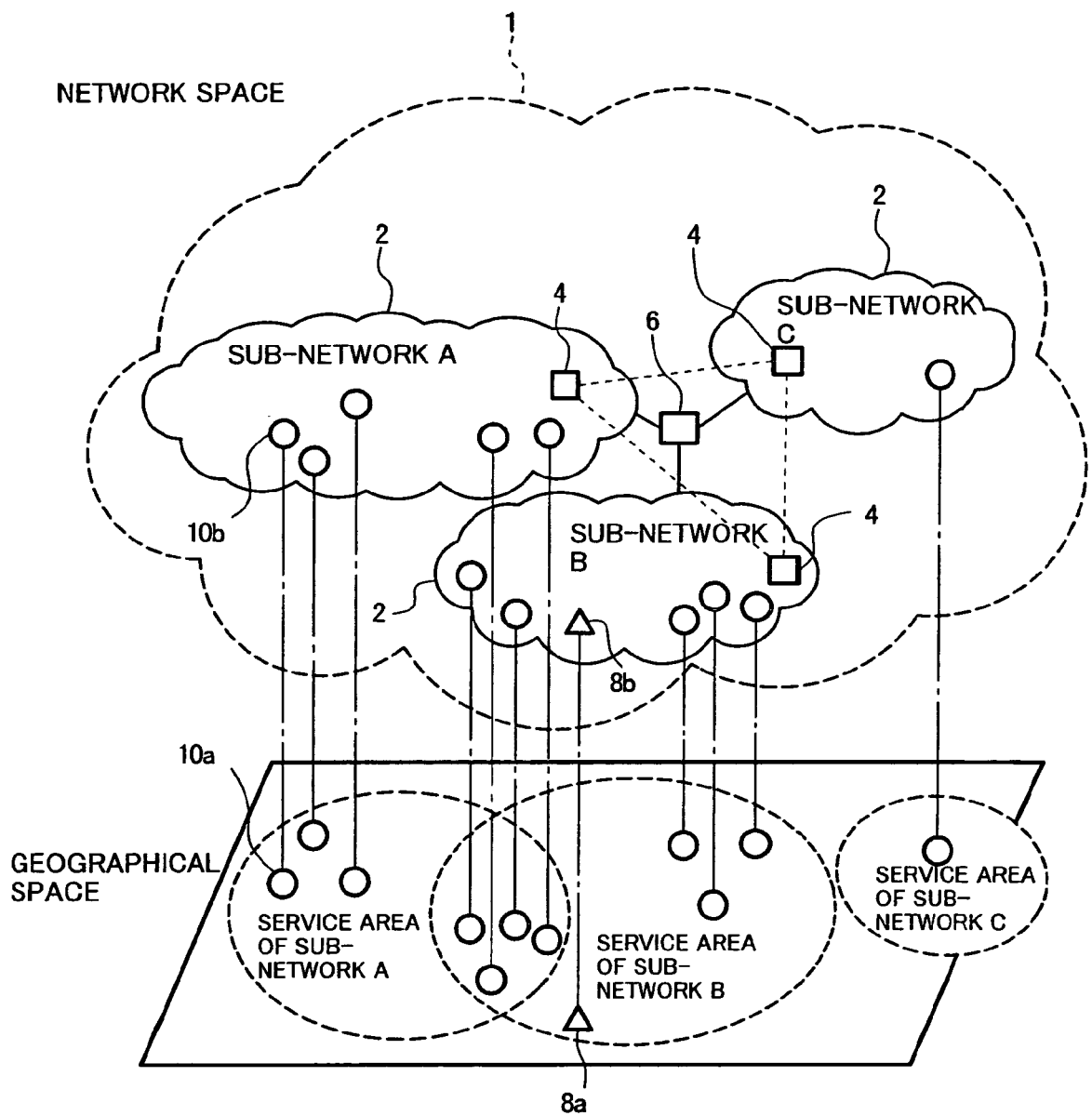
FIG. 1 is a conceptual view of a service retrieval system to which an embodiment of a service retrieval apparatus in accordance with the present invention is applied.

FIG. 1 is a conceptual view of a service retrieval system to which an embodiment of a service retrieval apparatus in accordance with the present invention is applied.

As described above, a service has an aspect of a service in a network space and an aspect of a server in a geographical space. In FIG. 1, a correspondence relation of the respective aspects is shown schematically. Note that one server is associated with one service for convenience's sake in FIG. 1, although one server may provide a plurality of services. Therefore, the term "server" and the term "service" provided by the server can be used synonymously. In FIG. 1, a wide area computer network 1 is divided into a plurality of sub-networks 2. A service retrieval apparatus 4 is disposed for each sub-network 2 and includes each sub-network 2 in a retrieval range of service retrieval which the service retrieval apparatus 4 itself performs. Each sub-network 2 is connected by a network relay apparatus 6 such as a router, and each service retrieval apparatus 4 can exchange information with the other service retrieval apparatuses 4.

In addition, the service retrieval apparatus 4 provides a retrieval service for, in response to a retrieval request from a client 8b included in the sub-network 2 to be a target of management, retrieving services 10b provided by servers 10a connected to its own sub-network 2, and further operating in association with the other service retrieval apparatuses 4 to thereby indirectly retrieve the services 10b provided by the servers 10a connected to the other sub-networks 2, and returning a result of the retrieval to the client 8b. Note that the service retrieval apparatus 4 may be an apparatus identical with the server 10a. The service retrieval apparatus 4 may be an apparatus identical with a client apparatus 8a. Moreover, the service retrieval apparatus 4 may be an apparatus identical with the network relay apparatus 6.

Moreover, the respective components shown in FIG. 1 will be described in detail.

First, the wide area computer network 1 is an IP network equivalent to the Internet. The wide area computer network 1 is established with the plurality of sub-networks 2 connected by the network relay apparatus 6. Each sub-network 2 makes it possible to perform broadcast according to IP multicast internally. The network relay apparatus 6 is set so as not to pass the IP multicast. Consequently, the broadcast does not reach the other sub-networks 2. Each sub-network 2 may be established with a plurality of sub-networks connected to the sub-network 2 by providing another network relay apparatus inside. However, in that case, the network relay apparatus arranged in the sub-network 2 is set so as to pass the IP multicast, and the broadcast has to be able to reach all the sub-networks inside the sub-network 2.

Figure 2:
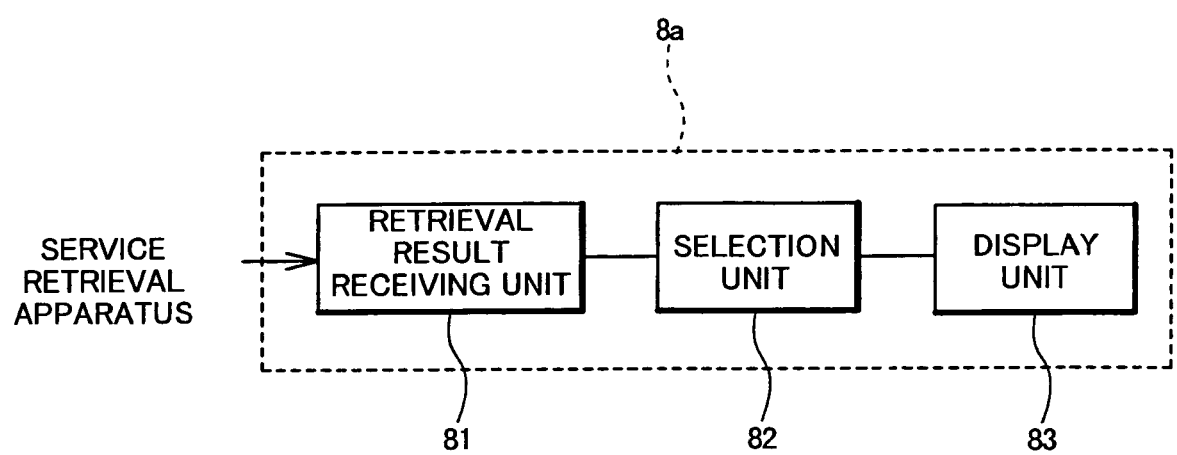
FIG. 2 is a block diagram of a client apparatus in this embodiment.

FIG. 2 is a block diagram of a client apparatus in this embodiment. In FIG. 2, a retrieval result receiving unit 81, a selection unit 82, and a display unit 83 are shown. The client apparatus 8a is a personal computer to be used by a user for requesting retrieval or acquisition of a processing result or a network device such as a printer, a scanner, or a device control apparatus. Alternatively, the client apparatus 8a may be a mobile device to be dynamically connected to the sub-network 2. The client apparatus 8a is the client 8b of the service 10b and, at the same time, becomes the client 8b of the service retrieval apparatus 4. The client apparatus 8a is provided with a user interface and, when retrieval conditions for a service are inputted from a user via the user interface, generates a retrieval formula in a predetermined syntax, and sends a retrieval request message including the retrieval formula to the service retrieval apparatus 4 in the identical sub-network 2. Then, the retrieval result receiving unit 81 receives a retrieval result message sent from the service retrieval apparatus 4 as a reply to the retrieval request message. Then, the display unit 83 extracts a list of service information, which is a retrieval result, from the retrieval result message, and generates a retrieval result display screen and provides it to the user.

The user designates attribute items of a service as retrieval conditions when the user requests retrieval. The selection unit 82 judges whether or not an attribute item represented by numerical data, magnitudes of which can be compared, is included in the retrieval conditions and, if such an attribute item is included in the retrieval conditions, selects the attribute item. There may be one attribute item, or a plurality of attribute items may be selected by assigning priorities to them. Then, upon receiving a retrieval result including a plurality of items of service information, the display unit 83 rearranges an order of the service information based upon a value with respect to the selected attribute item included in each piece of service information. For example, in the case in which the user designates a retrieval condition that a printer having an output resolution equal to or more than 600 dpi (dot per inch) is retrieved, the display unit 83 rearranges services in a descending order of magnitude of values with respect to the attribute item of the output resolution and generates a retrieval result display screen. Alternatively, the display unit 83 may rearrange the services in an order of closeness of the output resolution to 600 dpi, that is an ascending order of magnitude of numerical values. In this way, since the service information is arranged on the basis of a certain attribute item, the user easily finds desired service information from a plurality of items of service information.

Next, the server 10a is an apparatus in which at least one service 10b is capable of operating. The service 10b maintains its own service information. At the time of startup of service and at each fixed period during startup, the service 10b notifies the service retrieval apparatus 4 through broadcast that it is operating. In this embodiment, this notice is referred to as "public announcement of service". In addition, the service retrieval apparatus 4 in this embodiment can request transmission of service information by sending a service information request message to the server 10a. Therefore, upon receiving the service information request message from the service retrieval apparatus 4, the server 10a returns a response message including service information or a part of service information in response to this transmission request.

Figure 3:
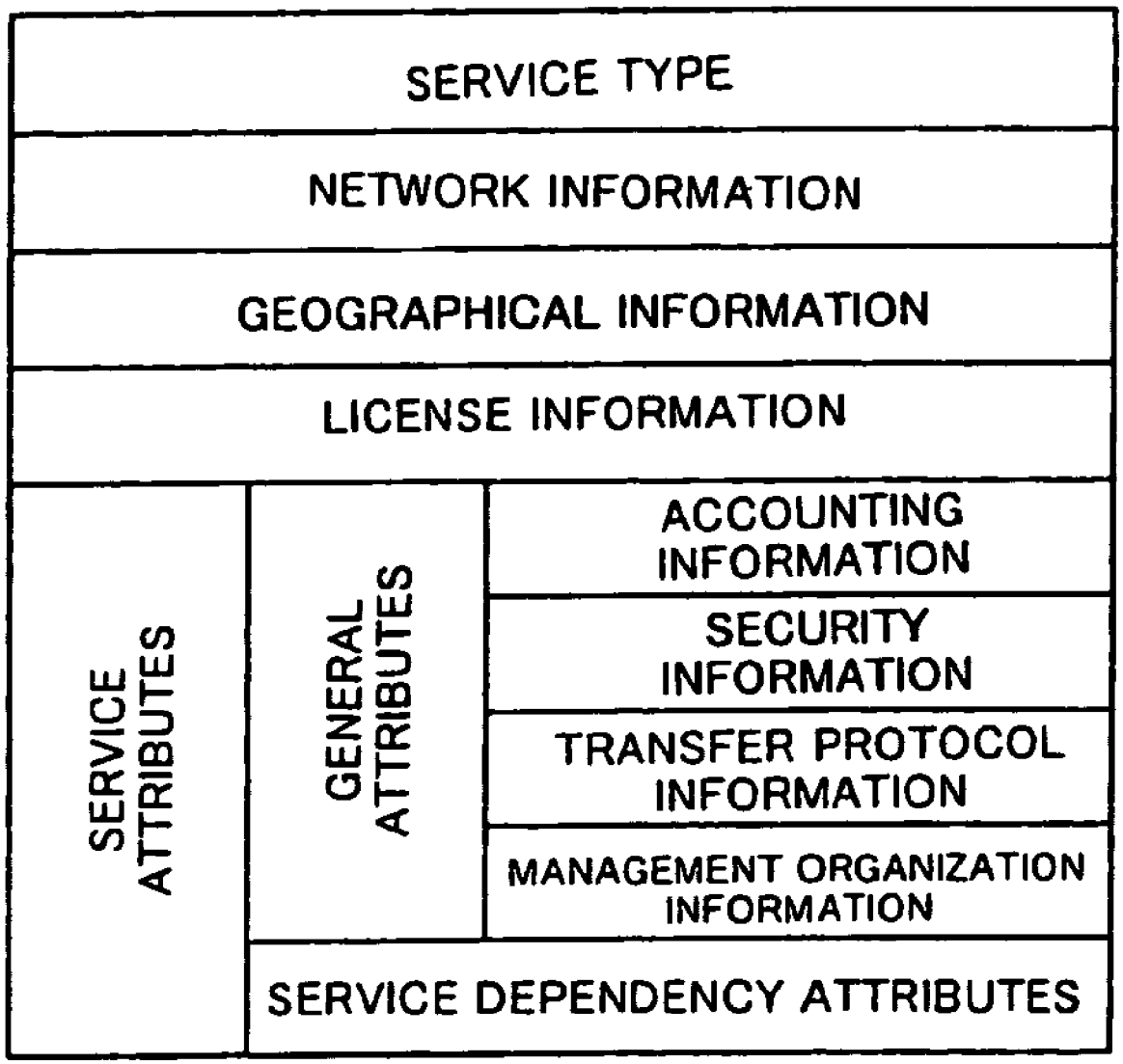
FIG. 3 is a table showing an example of a data structure of service information in this embodiment.

Here, service information in this embodiment will be described with reference to FIG. 3.

The service information is constituted by a service type, network information, geographical information, license information, and service attributes. The service type indicates a type of a service such as a print service or a scan service. The network information is a service location uniquely identifying a service on the wide area computer network 1 and is described with an IP address, an FQDN (Fully Qualified Domain Name), a URI (Universal Resource Identifier), or the like. The geographical information is, for example, information indicating a geographical position of the server 10a which is set by an administrator at the time of setting a service and has to include latitude and longitude coordinates. In addition, it is desirable to include the number of stories of a building set for clarifying movement of a setting position on identical coordinates. The license information is information for specifying a range for publicly announcing the service such as unlimited or network limited.

The service attributes are constituted by general attributes and service dependency attributes. The general attributes include accounting information, security information, transfer protocol information, and management organization information. The accounting information is a fee for the service and a method of paying the fee. The security information is a list of security protocols to which the service corresponds. The transfer protocol information is a communication protocol, an API (Application Program Interface), or the like for using the service. The management organization information is a name and a method of contacting a company, a department, an association, an individual, or the like which is an operator of the service. The service dependency attributes are defined for each service type and includes quality, performance, an additional function, a list of corresponding document formats, a list of corresponding languages, a list of corresponding character sets, information on where a driver is acquired from, and the like.

Next, the service retrieval apparatuses 4 are dispersed for each sub-network 2 and arranged. Each service retrieval apparatus 4 holds positions on a network (network addresses) of all the other service retrieval apparatuses 4. Consequently, each service retrieval apparatus 4 can perform communication with each of others. A cooperation network of the service retrieval apparatuses 4 is formed in this way. Note that communication among service retrieval apparatuses 4 is performed by transferring a message described in XML (eXtendable Markup Language) in accordance with an HTTP protocol.

The service retrieval apparatus 4 collects one or more items of service information from each server 10a existing in the corresponding sub-network 2 using broadcast and holds the service information. In this embodiment, since the server 10a and the service 10b are set to be in a one to one relation, one item of service information 10b is collected from each server 10a.

Upon receiving the service retrieval request message including a retrieval formula from the client 8b, the service retrieval apparatus 4 analyzes the retrieval formula and determines at least one sub-network 2 to be included in a retrieval range. Then, when the sub-network 2, to which the service retrieval apparatus 4 itself is connected, is not included in the one or more sub-networks 2 determined as the retrieval range, the service retrieval apparatus 4 relays to send the service retrieval request message from the client 8b to each service retrieval apparatus 4 corresponding to the determined sub-network 2.

The service retrieval apparatus 4 having received the service retrieval request message extracts a service satisfying the retrieval formula with reference to the service information held by itself, and returns a reply message to the service retrieval apparatus 4, which is the origin of relay, as an intermediate retrieval result. Upon receiving reply messages of intermediate retrieval results from all the service retrieval apparatuses 4, which are relay destinations, the service retrieval apparatus 4, which is the origin of the relay, merges the intermediate retrieval results to generate a retrieval result. In the case in which the number of services included in the retrieval result is equal to or more than the lower limit number of services set in advance and equal to or less than the upper limit number of services set in advance, the service retrieval apparatus returns a retrieval result message to the client.

On the other hand, in the case where the number of services included in the retrieval result message has exceeded the upper limit number of services, the service retrieval apparatus 4 deletes the service retrieval apparatuses 4, which are destinations of relay, thereby setting a narrower retrieval range. Setting a narrower retrieval range means decreasing the number of service retrieval apparatuses 4 which are destinations to which the retrieval request is relayed and sent, thereby decreasing the number of sub-networks 2 to be targets of retrieval to narrow the retrieval range. Then, the service retrieval apparatus 4 having received the retrieval request from the client 8b relays to send the service retrieval request message again to the service retrieval apparatus 4 falling into a retrieval range set anew. In this way, narrowing-down retrieval is performed.

In addition, in the case where the number of services included in the retrieval result message has not reached the lower limit number of services, the service retrieval apparatus 4 adds the service retrieval apparatus 4 to be a destination of relay, thereby setting a wider retrieval range. Setting a wider retrieval range means increasing the number of service retrieval apparatuses 4 which are destinations to which a retrieval request is relayed and sent, thereby increasing the number of sub-networks 2 to be targets of retrieval to widen a retrieval range. Then, the service retrieval apparatus 4 having received the retrieval request form the client 8b relays to send the service retrieval request message again to the service retrieval apparatus 4 falling into a retrieval range set anew. For example, if one is set as the lower limit number of services, retrieval is performed once more only when no corresponding service exists. In the case in which the number of services included in a retrieval result is zero even if the retrieval is repeatedly executed a predetermined number of times or within a predetermined time, a message indicating "there is no corresponding service" is returned to the client.

Note that, in relaying to send a retrieval request again, the service retrieval apparatus 4 having received the retrieval request from the client 8b may add or delete the service retrieval apparatus 4 to or from the service retrieval apparatuses 4 constituting the previous retrieval range or may set a new retrieval range excluding the previous retrieval range, that is, send a retrieval request to the service retrieval apparatuses 4 different from the previous time. Note that, when a retrieval result based upon retrieval conditions as requested by the client has not been obtained, it is desirable to reply to that effect together with a retrieval result.

Figure 4:
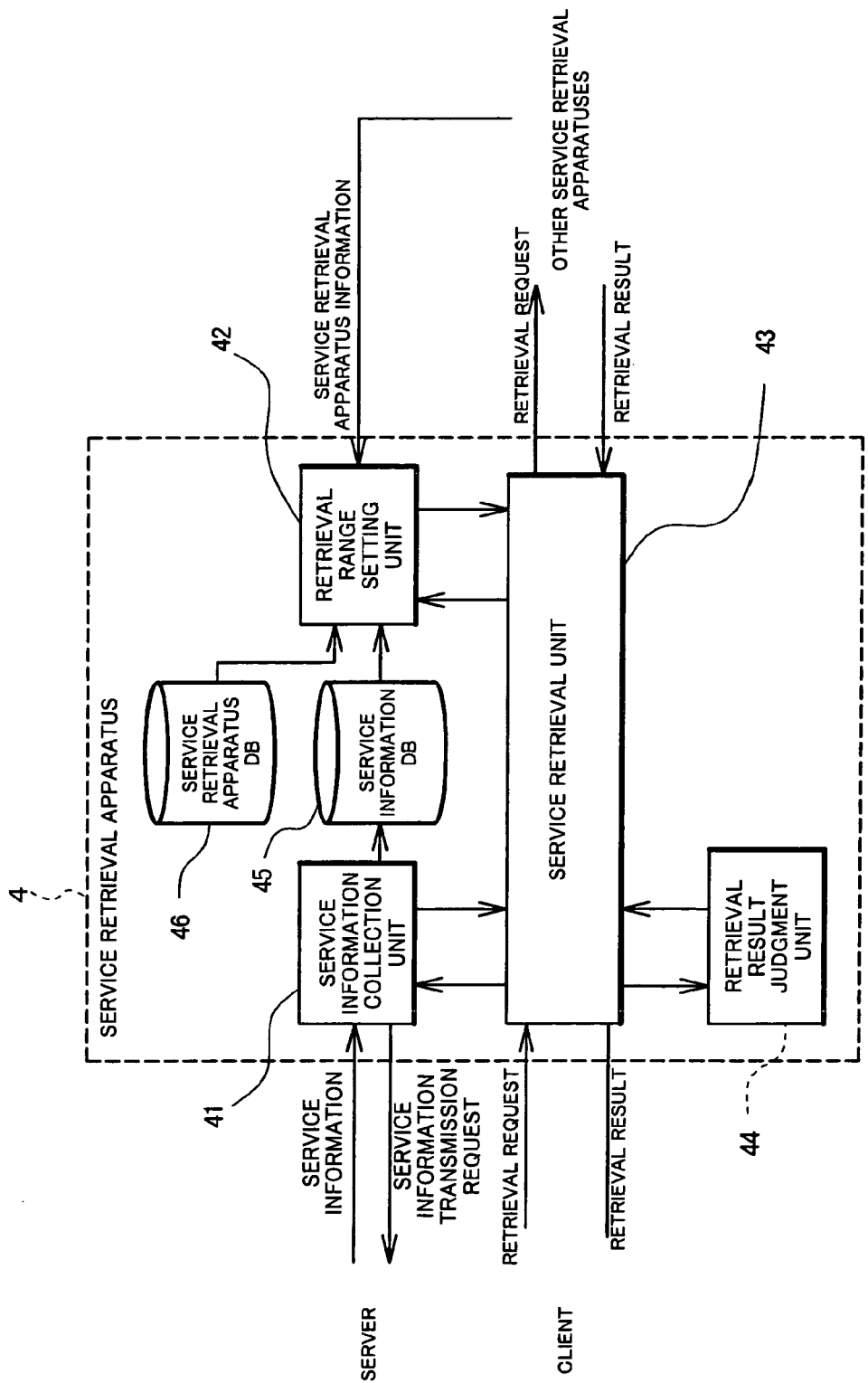
FIG. 4 is a block diagram showing a service retrieval apparatus in this embodiment.

FIG. 4 is a block diagram showing the service retrieval apparatus in this embodiment. An internal structure of the service retrieval apparatus and operations of respective components will be hereinafter described with reference to this figure.

The service retrieval apparatus 4 in this embodiment has a service information collection unit 41, a retrieval range setting unit 42, a service retrieval unit 43, and a retrieval result judgment unit 44, and further has a service information database 45 and a service retrieval apparatus database 46.

The service information collection unit 41 collects service information relating to services distributed in each sub-network 2 through broadcast and stores the service information in the service information database 45. A process performed by the service information collection unit 41 in this embodiment will be described with reference to FIGS. 5 to 7.

Figure 5:
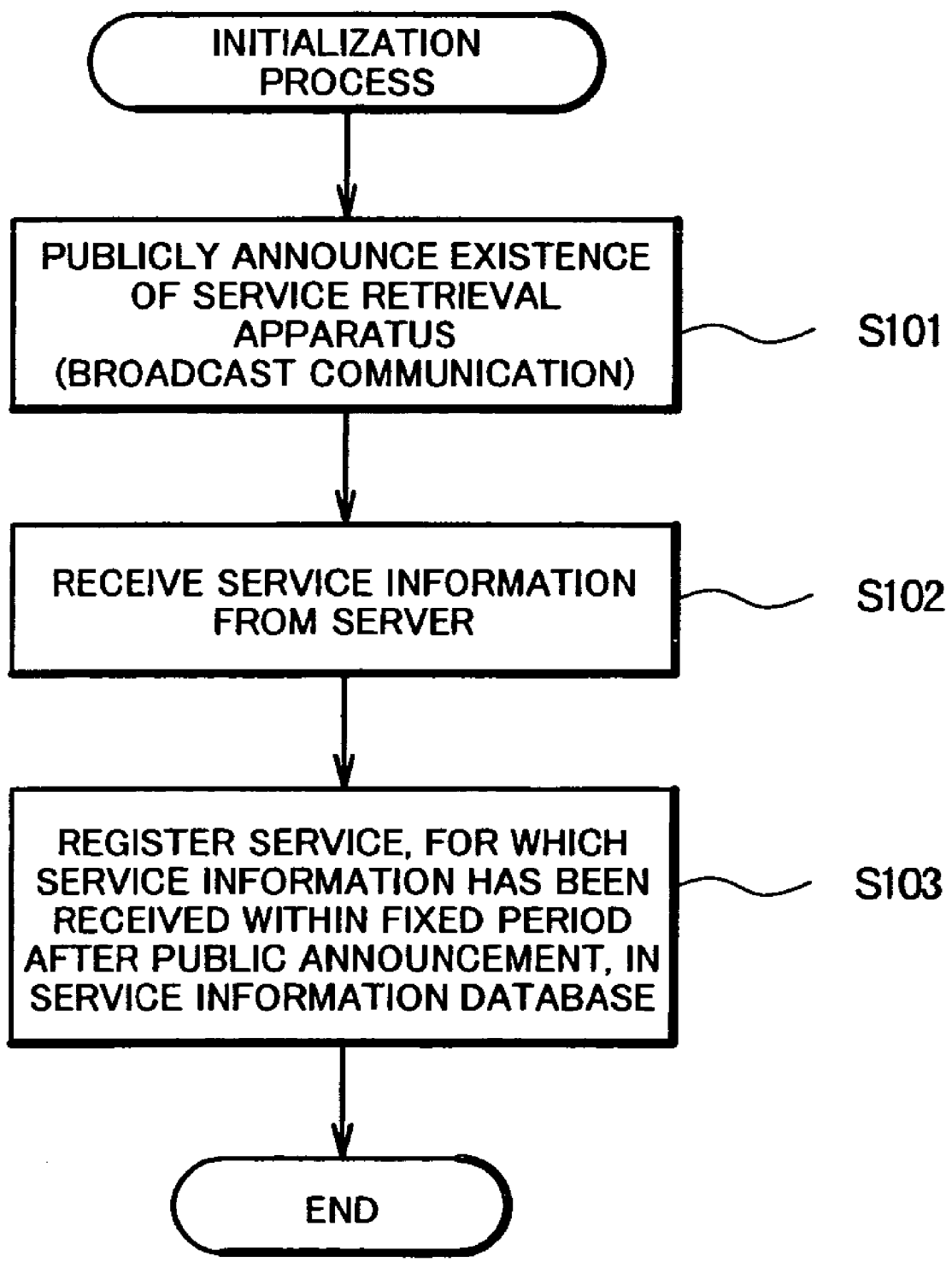
FIG. 5 is a flowchart showing an initialization process for a service information collection unit in this embodiment.

FIG. 5 is a flowchart showing an initialization process which is executed when the service information collection unit 41 is connected to the wide area computer network 1 for the first time. The service information collection unit 41 broadcasts that the service retrieval apparatus 4 exists in the wide area computer network 1 to thereby publicly announce the existence of the service retrieval apparatus (step 101). In response to this, the server 10*a* connected to the wide area computer network 1 returns service information of the server 10*a* itself to the service information collection unit 41. The service information collection unit 41 receives service information sent from each server 10*a* (step 102) and registers the service information in the service information database 45 (step 103). The service information collection unit 41 performs a registration process for registering service information in this database within a predetermined fixed period after publicly announcing the existence of the service retrieval apparatus 4.

Figure 6:
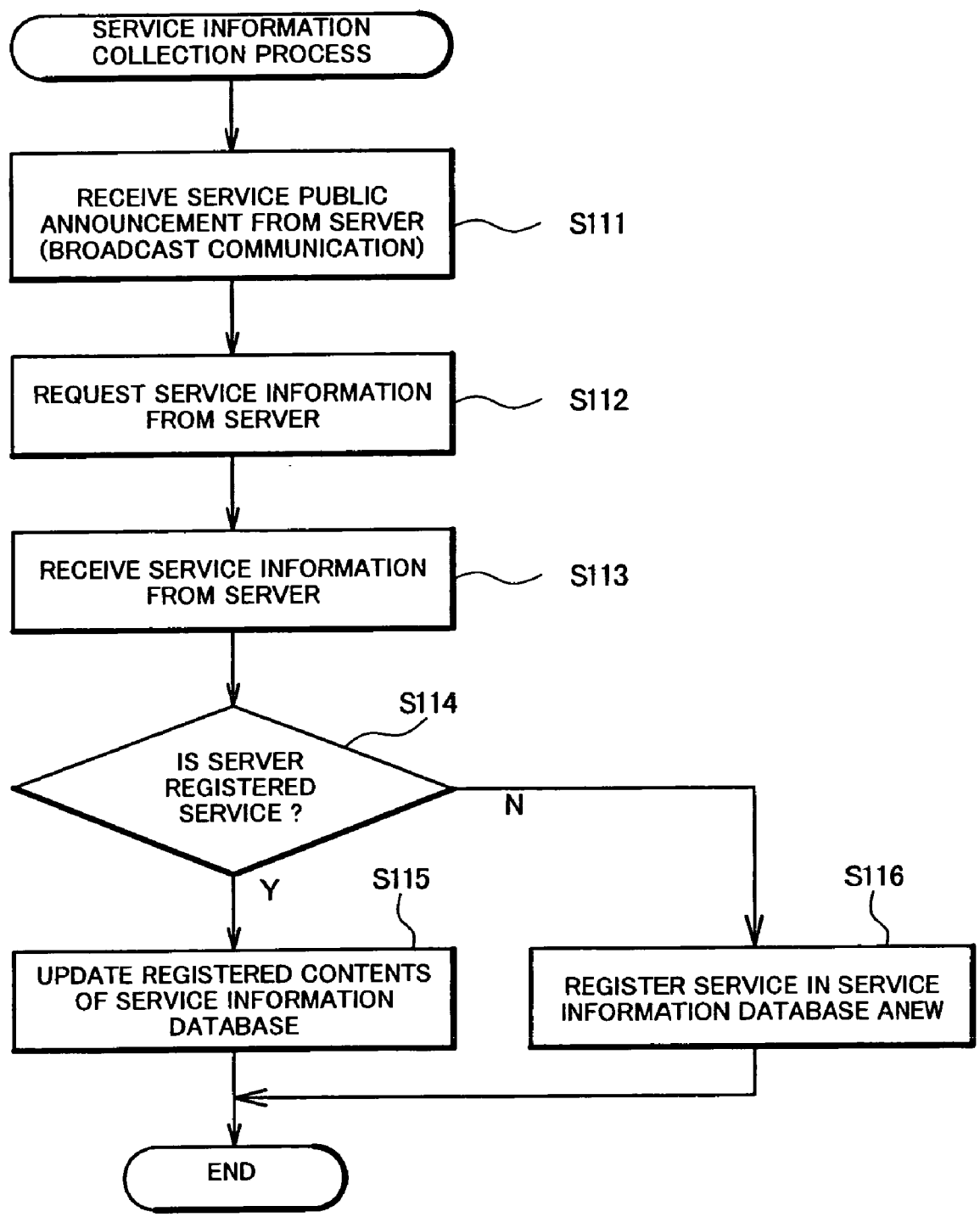
FIG. 6 is a flowchart showing a service information collection process of the service information collection unit in this embodiment.

FIG. 6 is a flowchart showing a service information collection process of the service information collection unit 41 in this embodiment. Upon receiving service public announcement from the server 10*a* (step 111), the service information collection unit 41 sends a service information request message to the server 10*a* as a service information transmission request (step 112). When a reply message including service information or a part of the service information is sent from the server 10*a* in response to this request, the service information collection unit 41 receives the message (step 113). Then, if the received service information has already been registered in the service information database 45, the service information collection unit 41 updates the service information database 45 with the received contents (steps 114 and 115) and, if the service information has not been registered, registers the service information in the service information database 45 anew (step 116).

Note that although each item of service information is described as being sent directly from each server 10*a* to the service information collection unit 41, since each service retrieval apparatus 4 should be maintaining service information of the service 10*b* in the corresponding sub-network 2, the service information of the service 10*b* in the corresponding sub-network 2 may be collectively sent from the other service retrieval apparatuses 4.

Figure 7:
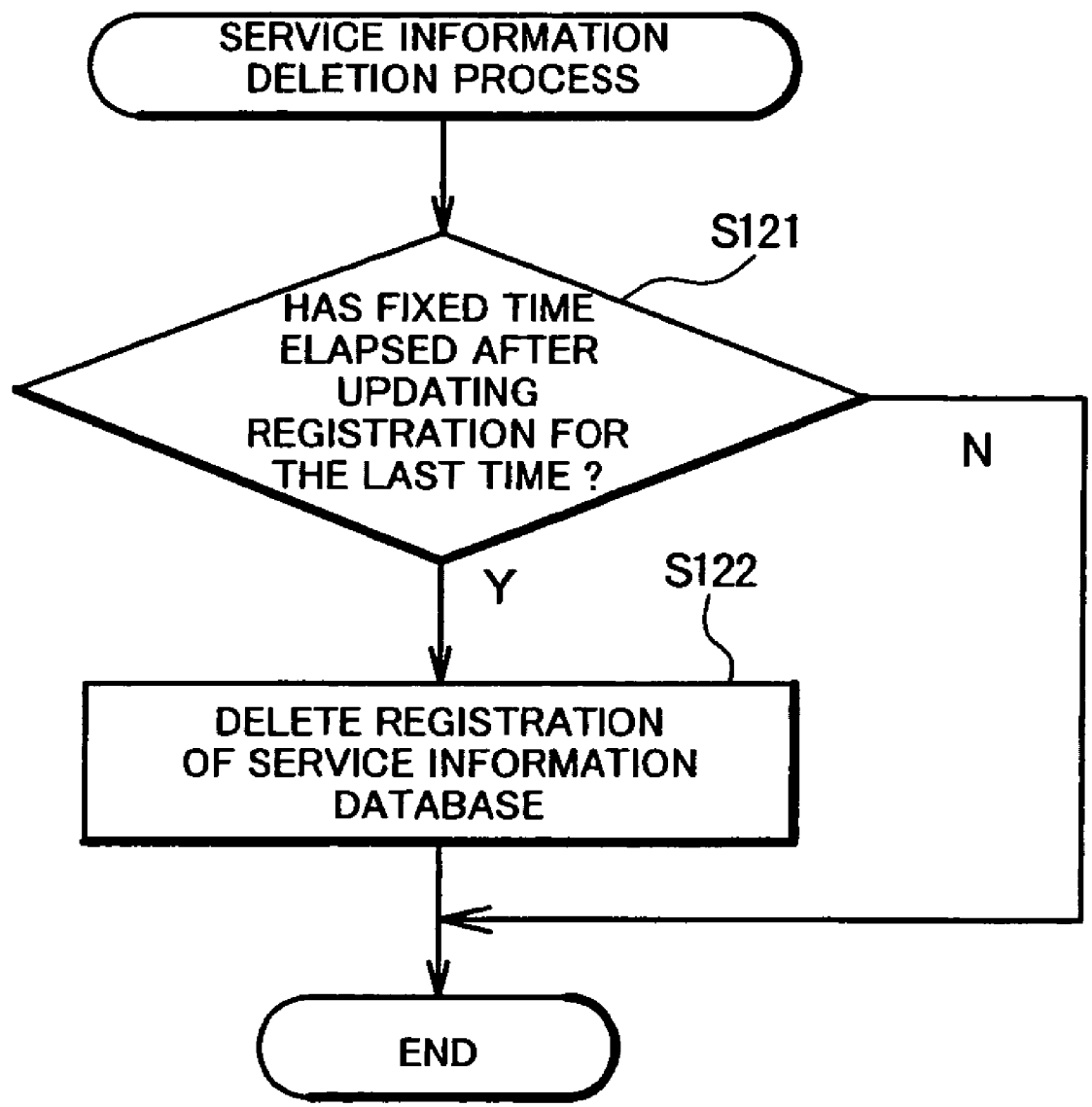
FIG. 7 is a flowchart showing a service information deletion process of the service information collection unit in this embodiment.

FIG. 7 is a flowchart showing a service information deletion process of the service information collection unit 41 in this embodiment. The service information collection unit 41 registers and updates the service information in the service information database 45 with the procedures shown in FIG. 6. However, when a predetermined fixed period has elapsed since each item of service information was registered or updated previously, the service information collection unit 41 deletes the service information from the service information database 45. The service information collection unit 41 updates the service information with a service public announcement sent at a fixed period as a trigger. However, the fact that the service public announcement is not sent after the fixed period has elapsed means that the server 10*a* which performed the service public announcement has stopped. Therefore, judging that the server 10*a* is in a state in which the server 10*a* cannot provide the service 10*b*, the service information collection unit 41 deletes the service information from the service information database 45. Since the service information is deleted for such a reason, it is desirable to set the fixed period to be a deadline for deleting service information and the period for sending service public announcement, taking them both into account.

As described above, the service information collection unit 41 collects service information and maintains and manages the service information by registering it in the service information database 45. In addition to the collection of the service information, the service information collection unit 41 obtains service information conforming to service conditions sent from the service retrieval unit 43 by retrieving the service information from the service information database 45 and sends a reply to the service retrieval section 43.

The retrieval range setting unit 42 sets a retrieval range at the time when a service is retrieved in the wide area computer network 1. More specifically, since a retrieval range is set by one or more sub-networks 2, the retrieval range setting unit 42 only has to determine the service retrieval apparatus 4 (including its own service retrieval apparatus 4) corresponding to the sub-network 2 included in the retrieval range. Since the service retrieval apparatus 4 retrieves the service 10*b* in a retrieval range corresponding to retrieval conditions designated in a retrieval request from the client, the retrieval range setting unit 42 has to grasp positional information of all the service retrieval apparatuses 4 for that purpose. Incidentally, as set by an administrator, each service retrieval apparatus 4 maintains at least geographical information including latitude and longitude coordinates of an installation place as installation place information and network information as address information. Thus, the retrieval range setting unit 42 collects the above-described information from each service retrieval apparatus 4 by exchanging information with retrieval range setting units of the other service retrieval apparatuses 4, and registers the information in the service retrieval apparatus database 46. In addition, in this case, the retrieval range setting unit 42 measures the number of hops of the network relay apparatus 6 and also maintains distances between the network relay apparatus 6 and the other service retrieval apparatuses 4 on the network.

The retrieval range setting unit 42 accepts a retrieval range setting request in which retrieval conditions are designated by the service retrieval unit 43. If the retrieval range setting request is a first retrieval range setting request with respect to a retrieval request from the client, the retrieval conditions sent from the service retrieval unit 43 are the same as the retrieval conditions from the client. Retrieval conditions to be sent include service type, a retrieval target area, and a retrieval target network designated by the user in the retrieval formula. However, the retrieval target area and the retrieval target network may be omitted. In addition, if the retrieval range setting request is a second or subsequent retrieval range setting request with respect to the retrieval request from the client, the previous result of judgment by the retrieval result judgment unit 44 is added to the retrieval conditions.

In the case where the retrieval target area is designated in the retrieval conditions, the retrieval range setting unit 42 retrieves the service retrieval apparatuses 4 included in that area from the service retrieval apparatus database 46, and returns a list of network addresses of the pertinent service retrieval apparatuses 4 to the service retrieval unit 43. In addition, in the case where the retrieval target network is designated in the retrieval conditions, the retrieval range setting unit 42 retrieves the service retrieval apparatuses 4 included in the network from the service retrieval apparatus database 46, and returns a list of network addresses of the pertinent service retrieval apparatuses 4 to the service retrieval unit 43. In the case where both the retrieval target area and the retrieval target network are omitted from the retrieval conditions, the retrieval range setting unit 42 first judges from the service type whether or not a service to be retrieved is a service for which a geographical condition is an important restricting condition. For example, the print service corresponds to such a service. If the service is a service for which a geographical condition is an important restricting condition as a result of the judgment, the retrieval range setting unit 42 sets a retrieval range which is in the geographic vicinity. That is, the retrieval range setting unit 42 defines a circle with latitude and longitude coordinates of its own installation place as a center and a predetermined value as a radius, and retrieves the service retrieval apparatuses 4, whose latitude and longitude coordinates of installation places are included inside the circle, from the service retrieval apparatus database 46. As to a service for which a geographical condition is not an important restricting condition, a retrieval range in the geographic vicinity of the retrieval range setting unit 42 in terms of network is set with reference to the number of hops or the like. In the case where the retrieval range in the geographic vicinity of the retrieval range setting unit 42 is set, the retrieval range setting unit 42 retrieves the service retrieval apparatuses 4 included in the area from the service retrieval apparatus database 46, and returns a list of network addresses of the pertinent service retrieval apparatuses 4 to the service retrieval unit 43. In the case where the retrieval range in the vicinity of the retrieval range setting unit 42 in terms of network is set, the retrieval range setting unit 42 returns its own network address and a list of network addresses of the service retrieval apparatuses 4 in its neighborhood to the service retrieval unit 43.

In the case where the result of judgment by the retrieval result judgment unit 44 is sent to the retrieval range setting unit 42 because the retrieval range setting request is a second or subsequent retrieval range setting request, if the result of judgment of the retrieval result requires setting of a wider retrieval range, the retrieval range setting unit 42 sets a retrieval range such that the service retrieval apparatuses 4 in more distant places are included in the retrieval range. If the result of judgment of the retrieval result requires setting of a narrower retrieval range, the retrieval range setting unit 42 sets a closer retrieval range such that the smaller number of service retrieval apparatuses 4 are included in the retrieval range.

The retrieval result judgment unit 44 has judgment criteria set in advance and judges whether or not the retrieval result sent from the service retrieval unit 43 satisfies the judgment criteria. The retrieval result judgment unit 44 receives a retrieval result which is obtained through retrieval processing performed by the service retrieval unit 43. Note that, at this point, since it is not decided that this retrieval result is returned to the client apparatus 8a, a retrieval result of this state is referred to as an "intermediate retrieval result". When the number of services included in this intermediate retrieval result satisfies a judgment criterion, for example, a judgment criterion that the number of services is equal to or more than the lower limit number of services (e.g., one) and equal to or less than the upper limit number of services (e.g., thirty), the retrieval result judgment unit 44 returns a judgment result, which requires the intermediate retrieval result to be presented to the client apparatus 8a as a retrieval result, to the service retrieval unit 43. In addition, when the number of services is less than the lower limit number of services, the retrieval result judgment unit 44 returns a judgment result, which requires a wider retrieval range to be set to retrieve the service retrieval apparatus 4 again, to the service retrieval unit 43. On the other hand, when the number of services has exceeded the upper limit number of services, the retrieval result judgment unit 44 returns a judgment result, which requires a narrower retrieval range to be set to retrieve the service retrieval apparatus 4 again, to the service retrieval unit 43.

Figure 8:
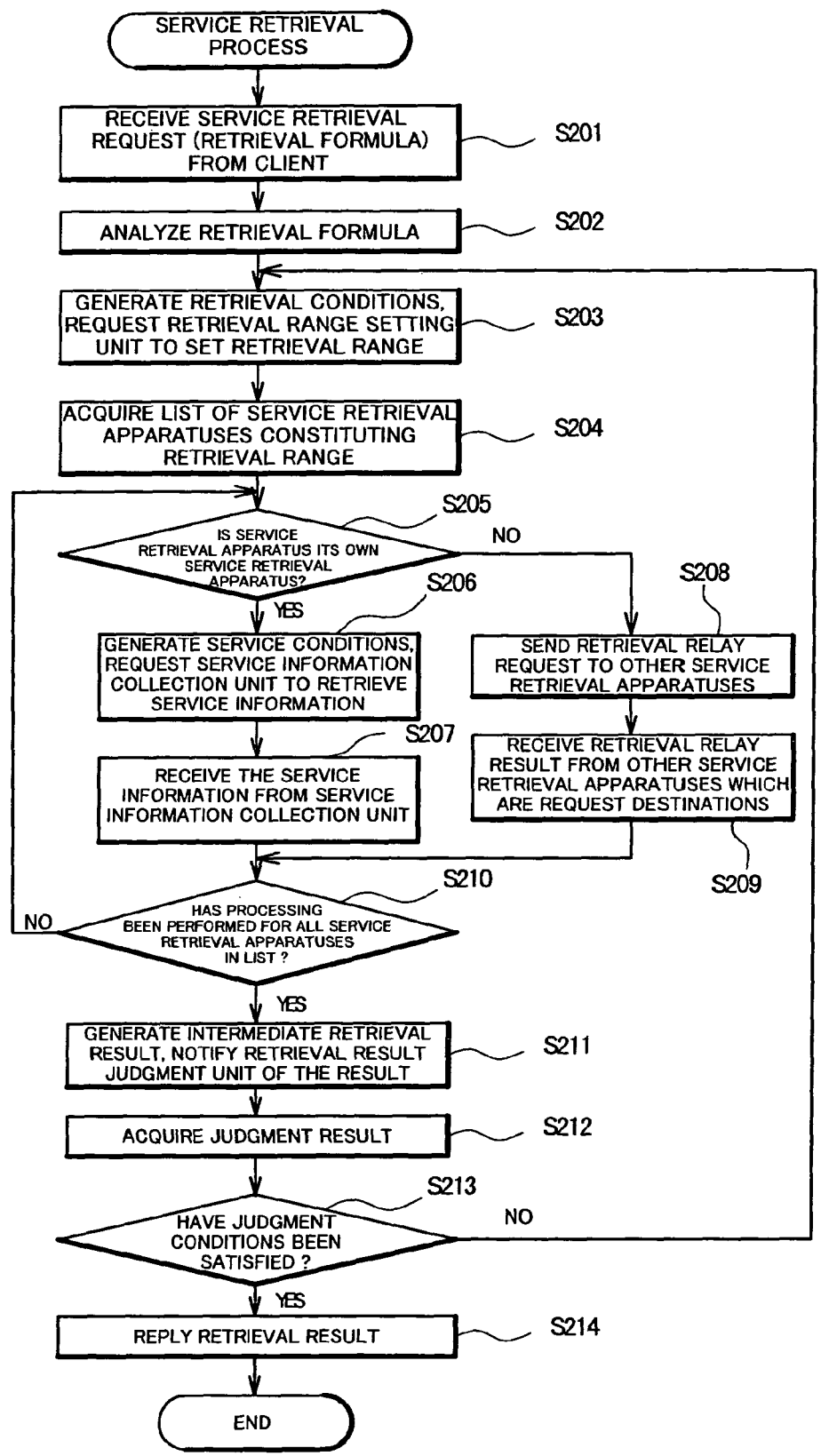
FIG. 8 is a flowchart showing processing which a service retrieval unit in this embodiment executes in response to a retrieval request from a client.
Figure 9:
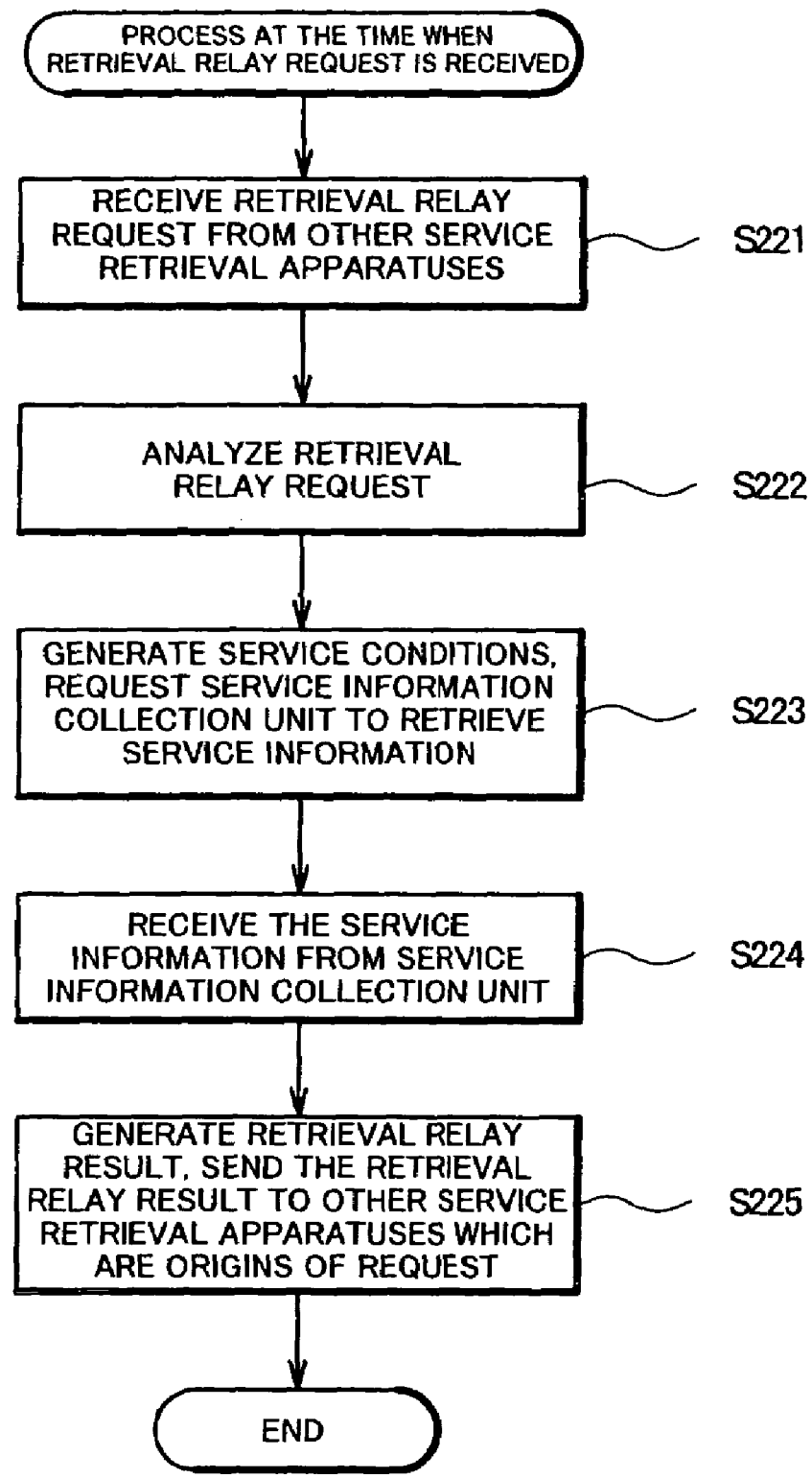
FIG. 9 is a flowchart showing a process which the service retrieval unit in this embodiment executes in response to a retrieval relay request from another service retrieval apparatus.

The service retrieval unit 43 performs processing control of the entire retrieval service provided by the service retrieval apparatus 4. In executing the service retrieval, the service retrieval unit 43 receives a retrieval request from the client 8b in some cases and receives a retrieval relay request from the other service retrieval apparatuses 4 in other cases. FIG. 8 is a flowchart showing processing corresponding to the former and FIG. 9 is a flowchart showing processing corresponding to the latter.

In FIG. 8, upon receiving a retrieval request from the client 8b (step 201), the service retrieval unit 43 analyzes contents of the retrieval request (step 202) and generates retrieval conditions. Then, the service retrieval unit 43 sends a retrieval range setting request to the retrieval range setting unit 42 designating the retrieval conditions (step 203). A retrieval range, which is set according to this request, is returned from the retrieval range setting unit 42. A list of network addresses of the service retrieval apparatuses 4 constituting the retrieval range is included in this reply (step 204).

The service retrieval unit 43 performs the following process according to the order of a list. First, if a network address extracted from the list is its own network address, the service retrieval unit 43 generates service conditions based upon the retrieval conditions in order to extract a service conforming to the retrieval condition, and sends the service conditions to the service information collection unit 41 to thereby request service information retrieval (steps 205 and 206). Then, the service retrieval unit 43 acquires service information sent from the service information collection unit 41 in response to this request (step 207).

On the other hand, when the network address extracted from the list is not its own network address, the service retrieval unit 43 relays the retrieval request to the service retrieval apparatus 4 whose network address is set (step 208). In the case where the retrieval request is sent to the other service retrieval apparatuses 4, this retrieval request is particularly referred to as a "retrieval relay request".

In FIG. 9, upon receiving a retrieval relay request from the other service retrieval apparatuses 4 (step 221), the service retrieval unit 43 analyzes contents of the retrieval relay request (step 222), generates service conditions in the same manner as steps 206 and 207, and then informs the service information collection unit 41 of the service conditions (step 223). Then, the service retrieval unit 43 returns service information obtained from the service information collection unit 41 as a retrieval result to the other service retrieval apparatuses 4 as a retrieval relay result (steps 224 and 225).

In FIG. 8, the service retrieval unit 43 having sent the retrieval relay request receives service information sent from the other service retrieval apparatuses 4 in response to the retrieval relay request (step 209). The service retrieval unit 43 applies the above-describe process to all the network addresses included in the list (step 210). Then, the service retrieval unit 43 merges the service information with the service information, which are acquired from the service information collection unit 41 and the other service retrieval apparatuses 4, respectively, through the processing of steps 205 to 210, to generate a retrieval result, and sends the retrieval result to the retrieval result judgment unit 44 (step 211). As describe above, the retrieval result judgment unit 44 judges whether or not the retrieval result satisfies the judgment criteria set in advance. The service retrieval unit 43 acquires a result of judgment by the retrieval result judgment unit 44 (step 212). If the judgment result satisfies the judgment criteria, the service retrieval unit 43 returns the retrieval result to the client 8b which has requested the retrieval (step 214).

Note that, as already described, when the client apparatus 8a receives a retrieval result including a plurality of items of service information, the client apparatus 8a can rearrange an order of the service information and output the service information. The rearrangement of the service information may be performed by the service retrieval unit 43. In this way, the client apparatus 8a does not have to rearrange the service information. Even the client apparatus 8a not having the rearrangement function can refer to the service information in a rearranged state. In addition, the rearrangement may be executed when predetermined conditions are met, for example, a condition that the rearrangement is executed in the case where the number of services has exceeded a number set in advance (e.g., ten) is met, rather than being performed at all times.

In addition, if the judgment result does not satisfy the judgment criteria in step 213, the service retrieval unit 43 returns the processing to step 203. In step 203, the service retrieval unit 43 sends a retrieval range setting request to the retrieval range setting unit 42 designating retrieval conditions. As described above, the retrieval range setting unit 42 operates so as to change a retrieval range when the retrieval range setting unit 42 receives a second or subsequent retrieval range setting request.

The service retrieval unit 43 repeats the retrieval processing from steps 203 to 213 while changing a retrieval range until the judgment result satisfies the judgment criteria. If a judgment result does not satisfy the judgment criteria even if this retrieval processing is repeatedly executed for a predetermined number of times or within a predetermined time, the service retrieval unit 43 returns a message indicating "there is no corresponding service" to the client.

According to this embodiment, service retrieval is performed in response to a retrieval request from a client as described above. When a retrieval result which does not satisfy judgment criteria is obtained at this point, a retrieval range is changed to perform retrieval again, which is convenient for a user because the user does not have to change the retrieval range from the client apparatus 8a.

Note that, in this embodiment, when an intermediate retrieval result satisfies the judgment criteria as a result of judgment by the retrieval result judgment unit 44, the intermediate retrieval result is returned to the client as a retrieval result. That is, it is considered that satisfying the judgment criteria is equal to satisfying the client. Therefore, in the case of this embodiment, how to set the judgment criteria is an important element. Although the judgment criteria are set in advance in this embodiment, common judgment criteria may be set for all the retrieval conditions or may be changed depending upon the retrieval conditions. In addition, it is unnecessary to set the judgment criteria according to one condition, and the judgment criteria may be set according to a plurality of conditions.

In addition, in this embodiment, the retrieval range setting unit 42 is provided to set a retrieval range based upon conditions related to a positional relation in a retrieval target area or a geographical space or a network space being a retrieval target area designated in retrieval conditions and to change the retrieval range when an intermediate retrieval result does not satisfy judgment criteria. However, the retrieval condition to be changed is not limited to the retrieval range, and other retrieval conditions may be changed. For example, in the service retrieval apparatus 4, restricting conditions according to range designation of 6 to 10 may be changed to 5 to 11, 6 to 11, 7 to 9, or the like. In addition, the retrieval conditions may be changed so as to expand functions such as changing designation of black and white printing to color printing.

In addition, in this embodiment, the service retrieval apparatus 4 acquires service information from the service 10b through broadcast according to the IP multicast. However, service information may be acquired through broadcast according to the IP broadcast. Alternatively, service information may be acquired as MIB (Management Information Base) information through broadcast according to SNMP (Simple Network Management Protocol; IETF RFC821).

In addition, in this embodiment, the wide area computer network 1 is divided into the plurality of sub-networks 2, and the service retrieval apparatus 4 is provided for each sub-network 2. Then, the service retrieval apparatus 4 operates in association with other service retrieval apparatuses to provide a retrieval service to the client 8b. However, the wide area computer network 1 need not be divided into the plurality of sub-networks 2, that is, retrieval may be performed with respect to the respective services 10b in the entire wide area computer network 1 by one service retrieval apparatus 4.

In addition, an administrator may artificially register service information in the service retrieval apparatus 4 at the time of setting the service 10b. In this case, each service 10b does not have to maintain the service information.

Further, in this embodiment, in order to exchange information among the service retrieval apparatuses 4, service retrieval apparatus information including installation position information on the network of all the other service retrieval apparatuses 4 is set in each service retrieval apparatus 4. However, the following constitution may be adopted.

As a first modified example, service retrieval apparatus information (hereinafter referred to simply as "apparatus information") of other at least one each service retrieval apparatus 4 is set in each service retrieval apparatus 4. For example, a service retrieval apparatus A sends a reply request to a known service retrieval apparatus B. The service retrieval apparatus B responds to the reply request and, at the same time, relays to send the reply request to a known service retrieval apparatus C. The service retrieval apparatus C responds to the replay request and, at the same time, relays to send the reply request to a known service retrieval apparatus D. Each service retrieval apparatus responds to the reply request relayed and sent to it with its own apparatus information, whereby the service retrieval apparatus A can obtain apparatus information of the service retrieval apparatuses other than the known service retrieval apparatus B. The service retrieval apparatuses may maintain the apparatus information acquired in this way internally as cache data.

As a second modified example, each service retrieval apparatus registers apparatus information of the service retrieval apparatus beforehand in a dedicated service (e.g., LDAP directory) on a wide area computer network. Each service retrieval apparatus acquires apparatus information of the other service retrieval apparatuses by communicating with the dedicated service. The service retrieval apparatuses may maintain the apparatus information acquired in this way internally as cache data.

As a third modified example, a service retrieval system logically hierarchizes to manage service retrieval apparatuses. The service retrieval apparatus of a highest hierarchy holds apparatus information of a plurality of service retrieval apparatuses. Each service retrieval apparatus of a second highest hierarchy holds apparatus information of a plurality of service retrieval apparatuses. Since such a tree structure is formed, the service retrieval system can obtain apparatus information of the other service retrieval apparatuses if it follows the tree structure. The service retrieval apparatuses may maintain the apparatus information acquired in this way internally as cache data.

What is claimed is:

1. A service retrieval apparatus which provides a retrieval service for retrieving a service provided by a server connected to a network in response to a request from a client and returning a result of the retrieval, the apparatus comprising:
a computer configured to function as:
a retrieval unit that sets a retrieval condition according to the request from the client and performs a first retrieval over the network for at least a print service or a scan service based upon the set retrieval condition;
a retrieval result judgment unit that judges whether or not a result of the first retrieval satisfies judgment criteria set in advance;
a retrieval result output unit that outputs the result which is judged to satisfy the judgment criteria, wherein judging to satisfy the judgment criteria comprises:
when it is judged that a number of one or more services included in the result of the first retrieval has not reached a lower limit number set as the judgment criteria, the retrieval unit performs a second retrieval that changes a geographic area which is wider in search, the geographic area being an area in which a server providing a service is located, and the retrieval unit performs the second retrieval, wherein:
the retrieval unit retrieves a first service location included in a first geographic area in the first retrieval,
the retrieval unit retrieves in a second retrieval a second service location included in a second geographic area which is wider in distance and different from the geographic area searched in the first retrieval; and
the service locations being locations searchable on the network and identifying the services; and
when it is judged that a number of one or more services included in the result of the first retrieval has exceeded an upper limit number set as the judgment criteria, the retrieval unit performs a second retrieval that changes a geographic area which is narrower in search, the geographic area being an area in which a server providing a service is located, and the retrieval unit performs the second retrieval, wherein:
the retrieval unit retrieves a first service location included in a first geographic area in the first retrieval,
the retrieval unit retrieves in a second retrieval a second service location included in a second geographic area which is narrower in distance and different from the geographic area searched in the first retrieval; and
the service locations being locations searchable on the network and identifying the services.

2. The service retrieval apparatus according to claim 1, comprising wherein the computer also is configured to function as a reply unit that rearranges the result of the retrieval based upon values with respect to attribute items included in the retrieval condition, and then returns the result of the retrieval to the client.

3. A system including a plurality of service retrieval apparatuses which provide a retrieval service for retrieving a service provided by a server connected to a network in response to a request from a client and returning a result of the retrieval, the system comprising:
a memory storing a service information database of service information including address information and installation position information of the server and attribute information of at least a print service or a scan service provided by the server;
a memory storing a service retrieval apparatus database that, when the network is divided into a plurality of sub-networks, the service retrieval apparatus database contains address information and installation position information of a service retrieval apparatus with each sub-network included in a retrieval range;
and a computer configured to function as:
a retrieval range setting unit that, by retrieving the service retrieval apparatus database based upon inputted retrieval conditions, the retrieval range setting unit specifies one or more service retrieval apparatuses conforming to the retrieval conditions and sets sub-networks, which correspond to the specified service retrieval apparatuses, as a retrieval range for the request;
a retrieval unit that executes a first retrieval over the network for a service according to the set retrieval range for the request;
a retrieval result judgment unit that judges whether or not a result of the first retrieval satisfies judgment criteria set in advance; and
a retrieval result output unit that outputs the result which is judged to satisfy the judgment criteria, wherein judging to satisfy the judgment criteria comprises:
when it is judged that a number of one or more services included in the result of the first retrieval does not reach a lower limit number set as the judgment criteria, the retrieval unit performs a second retrieval that changes a geographic area which is wider in search, the geographic area being an area in which a server providing a service is located, and the retrieval unit performs the second retrieval, wherein:
the retrieval unit retrieves a first service location included in a first geographic area in the first retrieval,
the retrieval unit retrieves a second service location included in a second geographic area, which is wider in distance and different from the geographic area searched in the first retrieval, in the second retrieval, and
the service locations being locations searchable on the network and identifying the services, and
when it is judged that a number of one or more services included in the result of the first retrieval has exceeded an upper limit number set as the judgment criteria, the retrieval unit performs a second retrieval that changes a geographic area which is narrower in search, the geographic area being an area in which a server providing a service is located, and the retrieval unit performs the second retrieval, wherein:
the retrieval unit retrieves a first service location included in a first geographic area in the first retrieval,
the retrieval unit retrieves in a second retrieval a second service location included in a second geographic area which is narrower in distance and different from the geographic area searched in the first retrieval; and
the service locations being locations searchable on the network and identifying the services.

4. The service retrieval apparatuses according to claim 3, comprising wherein the computer also is configured to function as a reply unit that rearranges the result of the retrieval based upon values with respect to attribute items included in the retrieval conditions, and then returns the result of the retrieval to said client.

5. A service retrieval method, performed by a computer, which retrieves a service provided by a server connected to a network in response to a request from a client and returns a result of the retrieval, the method comprising:

setting a retrieval condition in response to a request of the client;

performing a first retrieval over the network for at least a print service or a scan service based upon the retrieval condition;

judging whether or not a result of the first retrieval satisfies judgment criteria set in advance;

returning the result of the retrieval which is judged to satisfy the judgment criteria to the client; and wherein judging to satisfy the judgment criteria comprises:

when it is judged that a number of one or more services included in the result of the first retrieval does not reach a lower limit number set as the judgment criteria, performing a second retrieval that changes a geographic area which is wider in search, the geographic area being an area in which a server providing a service is located, wherein:

the first retrieval retrieves a first service location included in a first geographic area in the first retrieval, the second retrieval retrieves a second service location included in a second geographic area, which is wider in distance and different from the geographic area searched in the first retrieval, in the second retrieval; and the service locations being locations searchable on the network and identifying the services; and when it is judged that a number of one or more services included in the result of the first retrieval exceeds an upper limit set as the judgment criteria, performing a second retrieval that changes a geographic area which is narrower in search, the geographic area being an area in which a server providing a service is located, wherein:

the first retrieval retrieves a first service location included in a first geographic area in the first retrieval, the second retrieval retrieves a second service location included in a second geographic area, which is narrower in distance and different from the geographic area searched in the first retrieval, in the second retrievaL and the service locations being locations searchable on the network and identifying the services.

6. The service retrieval method according to claim 5, further comprising rearranging the result of the retrieval with respect to attribute items included in the retrieval condition, and returning the rearranged result of the retrieval to the client.

7. A service retrieval apparatus which provides a retrieval service for retrieving a service provided by a server connected to a network in response to a search request from a client and returning a result of the retrieval, the apparatus comprising:

a computer configured to function as:

a retrieval unit that sets a retrieval condition with respect to a retrieval range according to the search request from the client and performs a first retrieval for at least a print service or a scan service based upon the set retrieval condition, the retrieval range indicating a sub-network of the network subjected to the first retrieval;

a retrieval result judgment unit that judges whether or not a result of the first retrieval satisfies judgment criteria set in advance; and a retrieval result output unit that outputs the result which is judged to satisfy the judgment criteria, wherein judging to satisfy the judgment criteria comprises:

when it is judged that a number of one or more services included in the result of the first retrieval has not reached a lower limit number set as the judgment criteria, the retrieval unit performs a second retrieval that changes a geographic area which is a wider search, the geographic area being an area in which a server providing a service is located, and the retrieval unit performs the second retrieval, wherein:

the retrieval unit retrieves a first service location included in a first geographic area in the first retrieval, the retrieval unit retrieves in a second retrieval a second service location included in a second geographic area which is wider in distance and different from the geographic area searched in the first retrieval; and the service locations being locations searchable on the network and identifying the services; and when it is judged that a number of one or more services included in the result of the first retrieval has exceeded an upper limit number set as the judgment criteria, the retrieval unit performs a second retrieval that changes a geographic area which is narrower in search, the geographic area being an area in which a server providing a service is located, and the retrieval unit performs the second retrieval, wherein:

the retrieval unit retrieves a first service location included in a first geographic area in the first retrieval, the retrieval unit retrieves in a second retrieval a second service location included in a second geographic area which is narrower in distance and different from the geographic area searched in the first retrieva; and the service locations being locations searchable on the network and identifying the services.

8. The service retrieval apparatus according to claim 7, wherein:

if the search request from the client includes neither the retrieval range nor a retrieval target area, the retrieval unit judges whether or not a service to be retrieved is a service for which a geographical condition is important, and if the service to be retrieved is the service for which the geographical condition is judged to be important, the retrieval unit sets an area which is geographic vicinity as the retrieval range of the first retrieval.

9. The service retrieval apparatus according to claim 7, wherein the retrieval unit defines a circle with latitude and longitude coordinates of its own installation place as a center and a predetermined value as a radius, and retrieves the service whose latitude and longitude coordinates are included inside the circle.

* * * * *